(12) United States Patent
Wasser

(10) Patent No.: US 8,215,471 B2
(45) Date of Patent: Jul. 10, 2012

(54) MECHANICAL BRAKE

(75) Inventor: Tobias Wasser, Freiburg (DE)

(73) Assignee: Auma Riester GmbH & Co. KG, Mullheim (DE)

(*) Notice: Subject to any disclaimer, the term of this patent is extended or adjusted under 35 U.S.C. 154(b) by 586 days.

(21) Appl. No.: 12/453,016

(22) Filed: Apr. 28, 2009

(65) Prior Publication Data

US 2009/0277726 A1    Nov. 12, 2009

Related U.S. Application Data

(60) Provisional application No. 61/071,396, filed on Apr. 28, 2008.

(51) Int. Cl.
*F16D 59/00* (2006.01)
(52) U.S. Cl. ..................... 192/223.3; 188/134
(58) Field of Classification Search .................. 192/223, 192/223.3; 188/134
See application file for complete search history.

(56) References Cited

U.S. PATENT DOCUMENTS

| | | | |
|---|---|---|---|
| 3,667,578 A * | 6/1972 | Johnson ...................... | 192/223.3 |
| 4,878,567 A | 11/1989 | Buckley | |
| 6,769,527 B1 * | 8/2004 | Paris .......................... | 192/223.3 |
| 6,877,594 B2 | 4/2005 | Kuivamaki | |
| 6,974,015 B2 * | 12/2005 | Gamache .................... | 192/223.3 |
| 2004/0168865 A1 | 9/2004 | Kuivamaki | |
| 2006/0081800 A1 | 4/2006 | Riester | |
| 2006/0163026 A1 | 7/2006 | Lang | |

FOREIGN PATENT DOCUMENTS

DE    8509971 U    8/1985
WO    WO 2005/095818 A1    10/2005

* cited by examiner

*Primary Examiner* — Richard M. Lorence
(74) *Attorney, Agent, or Firm* — Bacon & Thomas, PLLC

(57) ABSTRACT

A mechanical brake having an axial shifting mechanism arranged on an input drive shaft and an axial shifting mechanism arranged on an output drive shaft. The two axial shifting mechanisms are so embodied that their shifting directions are opposed and that, upon introduction of a torque via the input drive shaft and/or the output drive shaft, the axial shifting mechanism associated with the input drive shaft has precedence over the axial shifting mechanism associated with the output drive shaft.

14 Claims, 3 Drawing Sheets

MECHANICAL BRAKE

This application is a nonprovisional application which claims the benefit of U.S. Provisional Application No. 61/071,396 filed on Apr. 28, 2008.

TECHNICAL FIELD

The invention relates to a mechanical brake.

BACKGROUND DISCUSSION

In the field of actuator drives, load torque blockers are regularly used to enable an unhindered operation of a machine part in both directions by means of a rotary drive, for example with the help of a motor or a hand-wheel, while blocking, in both directions, reverse-acting torques of the driven part on the drive, without an additional braking system being needed therefor.

Electrical actuator drives for operating elements must be designed such that they can transmit, at low rotational speeds (4-180 RPM), high torques (30-500,000 Nm), wherein the transmitted torques must be highly constant at small angles of rotation.

In the case of known actuator drives, torque transmission between an electric motor and an operating element, such as a valve, is accomplished via a speed-reduction transmission. The speed-reduction transmission is necessary, in order to convert the high RPM of the electric motor into the desired, highly constant, drive RPM for actuating the operating element. Preferably, worm-gear transmissions are used as the speed-reduction transmissions and are so embodied that they exhibit a self-braking characteristic. The advantage, that an accidental and undesired rotation of the drive shaft can be effectively blocked by the intrinsic self-braking, is bought with the disadvantage that total efficiency falls.

DE 10 2004 048 366 B1 discloses a direct drive, or direct actuator, in the case of which the drive shaft is directly and immediately connected with the actuating member, or operating element. Thus, there is no interposed, however fashioned, transmission for converting the motor RPM to the drive RPM for actuating the operating element. The exact positioning of the actuator drive is accomplished via a suitable electric control of the electric motor. The disclosed, direct drive is distinguished, especially, by the fact that an additional braking apparatus can be omitted for the electric motor. The blocking occurs electrically, in that the coils of the coil arrangement are short circuited by the control in the case of a separate actuating of the drive shaft via the actuating wheel. If, now, the actuating wheel is actuated, there is induced in the stator of the electric motor a voltage which acts against the torque exerted by the actuating wheel.

Furthermore, the state of the art discloses special mechanical torque, or load torque, blockers. The torque, or load torque, blocker known from DE 8509971 U works according to the jamming roller, or jamming wedge, principle. In this case, a closed, annular housing contains a fitting, cylindrical, inner element, which is connected, secured against rotation, with the output drive part, thus the part to be driven. The cylindrical, inner element has on its periphery a recess, in which are arranged jamming roller, in each case biased in the outer direction by jamming springs. This block rotation of the cylindrical, inner element relative to the annular, outer housing. Arranged between the two jamming rollers is a ridged-shaped input drive part, which is e.g. part of the hand-wheel. If this input drive part is rotated in one or the other direction of rotation, one of the two jamming rollers is released against the force of the pressure spring and the output drive part can be displaced. In this instance, the second jamming roller is free. Reverse torques from the output drive part are, in contrast, blocked in both directions of rotation.

Rotary drives with torque blockers according to the jamming roller principle are used, for example, for position securement on displacement drives for machine parts. Furthermore, they serve e.g. for securement and hand displacement of gate drives, for hatch and window securement, or for rebound safety in the case of control, or shutoff, valves. The disadvantage of the known torque blocker operating according to the jamming roller, or also jamming wedge, principle is to be seen in the fact that these torque blockers can show a critical blocking behavior. Additionally, they experience a relatively high wear, since, by the repeated jamming and subsequent releasing of the jamming elements, the components coming in contact with one another are exposed to high frictional forces. Due to the loss of dimension or possible deformation of the material, a continuing worsening of the blocking function can be experienced. In the case of a consideration from the point of view of economics, it is evident that torque blockers operating on the basis of the jamming roller principle are unsuitable for application at higher RPMs.

WO 2006/0063874 A1 discloses a torque blocker for an actuator drive for likewise preventing the transmission of reverse-acting torques from an operating element onto the drive part. To this end, arranged in a blocking ring are a wrap spring and a two-part drive shaft, with an entrainment mechanism on the input drive side and a blocking mechanism on the output drive side. The entrainment element is mounted on the input drive shaft of the torque blocker, while, on the output drive shaft of the torque blocker, a blocking piece is secured. The two end regions of the entrainment element lie against the inner sides of the spring ends of the wrap spring.

As soon as the torque blocking drive shaft rotates due to a torque introduction from the input drive side, the entrainment element drives with, in each case, one of its end regions, the wrap spring via the inner sides of the spring ends. The wrap spring is, because of this, released from the blocking ring, whereby a rotation of the output drive shaft is possible. If a reverse-acting torque is introduced via the output drive shaft of the torque blocker, e.g. from the valve, then, depending on direction of rotation, the pertinent end region of the blocking piece is pressed from the outside on one of the spring ends, whereby the wrap spring is pressed under force against the blocking ring, whereby a rotation of the output drive shaft is effectively prevented. Also with this known solution, high RPMs cannot be implemented, so that torque blockers operating according to the wrap-spring principle can be very advantageously applied on the transmission output side, but they are less applicable on the transmission input side.

A torque limiter is available from the firm, Ringspann, under the designation, Durchratsch-Sikumat (Through-Ratcheting Sikumat). A brake cone secured to the output drive shaft is, for purpose of braking/locking, pressed via a pressure spring into a corresponding, fixed, housing part. Between the input drive shaft and the brake cone lie, on both sides, inclined switching surfaces with, as required, balls lying therebetween. If a rotation is initiated via the input drive shaft, the balls roll on the inclined planes and press the brake cone out of its seat in the housing. By the interruption of the frictional contact between the brake cone and the housing, a torque is transmitted via the input drive shaft to the output drive shaft. This known torque limiter is embodied as a mechanical safety system, which, upon reaching a set limiting torque, separates the output drive from the input drive, and so protects against damage or down time. Following removal of the overload, the torque limiter automatically re-engages. A limit switch signals reaching of overload, so that suitable countermeasures can be undertaken.

A disadvantage of this known solution is that the braking action is limited by the spring force of the pressure spring. As soon as the output drive torque becomes greater than the braking torque, which is produced by the spring force of the pressure spring, the torque limiter slips and a safe clamping function is no longer assured. This known solution is, therefore, not usable as a torque blocker.

SUMMARY OF THE INVENTION

An object of the invention is to provide a self-reinforcing and self-actuatingly controlling, mechanical brake, especially a mechanical, motor brake.

The object is achieved by the features that the mechanical brake, especially a motor brake, is equipped with an axial shifting mechanism arranged on an input drive shaft and an axial shifting mechanism arranged on an output drive shaft, wherein the two axial shifting mechanisms are so embodied that their shifting directions are opposite and that, in the case of introduction of a torque via the input drive shaft and/or the output drive shaft, the axial shifting mechanism associated with the input drive shaft has precedence over the axial shifting mechanism associated with the output drive shaft. The brake, especially the motor brake, of the invention has the advantage that it self-actuatingly controls itself, when a torque is introduced from the output drive side. Furthermore, the brake of the invention works purely mechanically.

In a preferred embodiment of the brake of the invention, the axial shifting mechanism associated with the input drive shaft is an axial extraction mechanism, while the axial shifting mechanism associated with the output drive shaft is an axial insertion mechanism.

The axial extraction mechanism and the axial insertion mechanism are preferably so embodied that they work in the following manner: For the case in which the magnitude of the torque introduced via the input drive shaft is greater than the magnitude of the torque introduced via the output drive shaft, the axial extraction mechanism is unlocked and the axial insertion mechanism is locked, so that torque is transmitted from the input drive shaft to the output drive shaft. If, in contrast, the magnitude of the torque introduced via the input drive shaft is smaller than the magnitude of the torque introduced via the output drive shaft, then the extraction mechanism and, consequently, the input drive shaft, is locked. The greater the torque introduced via the output drive shaft in comparison to the torque introduced via the input drive shaft, the stronger and more effective is the locking of the input drive shaft. To be mentioned is that, from the side of the input drive shaft, each of the two rotational directions is transmitted onto the output drive shaft.

If, in contrast, no torque is introduced via the input drive shaft and no torque is introduced via the output drive shaft, then the axial extraction mechanism is locked by the action of the predetermined spring force of a spring element. This spring element is so designed that, in every case, a sufficient locking action is achieved.

If there is no torque applied to the input drive shaft, while a torque is acting on the output drive shaft, then the locking action of the axial extraction mechanism by the torque introduced via the output drive shaft is, as already mentioned above, still further strengthened. Consequently, it is always assured that no torque leading to a highly undesired rotation of the input drive shaft is transmitted from the output drive shaft to the input drive shaft.

In an advantageous embodiment of the brake of the invention, a first, rotationally symmetric, braking element, which is rigidly connected with the housing of the brake, especially motor brake, and a second rotationally symmetric, braking element, which is connected with the output drive shaft, are provided. The two braking elements cooperate, due to their complementary forms, or constructions, such that, in the case of locking of the extraction mechanism, the locking, or braking, effect occurs by a mechanical contact between the braking surfaces of the first braking element and the second braking element.

Furthermore, it is provided that the axial extraction mechanism associated with the input drive shaft is arranged on a smaller radius from the longitudinal axis of the input/output drive shaft than is the axial insertion mechanism associated with the output drive shaft. In this way, it is assured that the axial shiftings do not mutually block one another, when torques are introduced simultaneously via the input drive shaft and the output drive shaft.

Additionally, it is provided that the axial extraction- and/or insertion-mechanism are/is composed of, in each case, two switching rings having inclined switching surfaces, which, in the case of a torque introduction via the output drive shaft, are displaceable by an angle alpha relative to one another.

An alternative embodiment, instead of the above-described solution, in which the axial extraction mechanism associated with the input drive shaft is arranged on a smaller radius from the longitudinal axis of the input/output drive shaft than the axial insertion mechanism associated with the output drive shaft, provides as follows: The axial extraction- and/or the axial insertion-mechanism have/has recesses with inclined switching surfaces, wherein the recesses on the switching rings of the input drive side, extraction mechanism and the recesses on the switching rings of the output drive side, insertion mechanism have a different slope and/or a different dimensioning. This permits optimizing of both the braking force, as well as also the responsive behavior of the brake, or motor brake.

For the purpose of attaining a better efficiency—instead of sliding friction, there occurs, now, a rolling friction—a switching element is arranged between each two switching surfaces of the switching rings. Preferably, the switching elements are balls, rollers or needles. In this way, wear on interacting components can be minimized. In this connection, in a preferred embodiment of the apparatus of the invention, it is provided that the diameter of the balls arranged between the two switching rings of the extraction mechanism differs from the diameter of the balls arranged between the switching rings of the insertion mechanism. In this way, the danger already mentioned above of the blocking of the brake in the case of simultaneous torque introduction from the input drive side and the output drive side is avoided. In general, it can be said that the responsive behavior of the brake is improved.

Furthermore, it is provided that the first rotationally symmetric, brake element is arranged not rigidly (as already described above), but, instead, torque-softly on the housing of the brake. This embodiment has, as compared to the rigid connection between the braking element and the housing, the advantage that the brake does not respond immediately, or abruptly. To achieve a torque-soft arrangement of the braking element on the housing, an elastomeric ply, a spring and/or a damping element can be applied.

As already mentioned above, the brake described in various variants above is preferably usable as a motor brake. Especially advantageous is its application as a torque blocker in an actuator drive.

BRIEF DESCRIPTION OF THE DRAWINGS

The invention will now be explained in greater detail on the basis of the drawing, the figures of which show as follows.

DETAILED DISCUSSION IN CONJUNCTION WITH THE DRAWINGS

Figure 1:
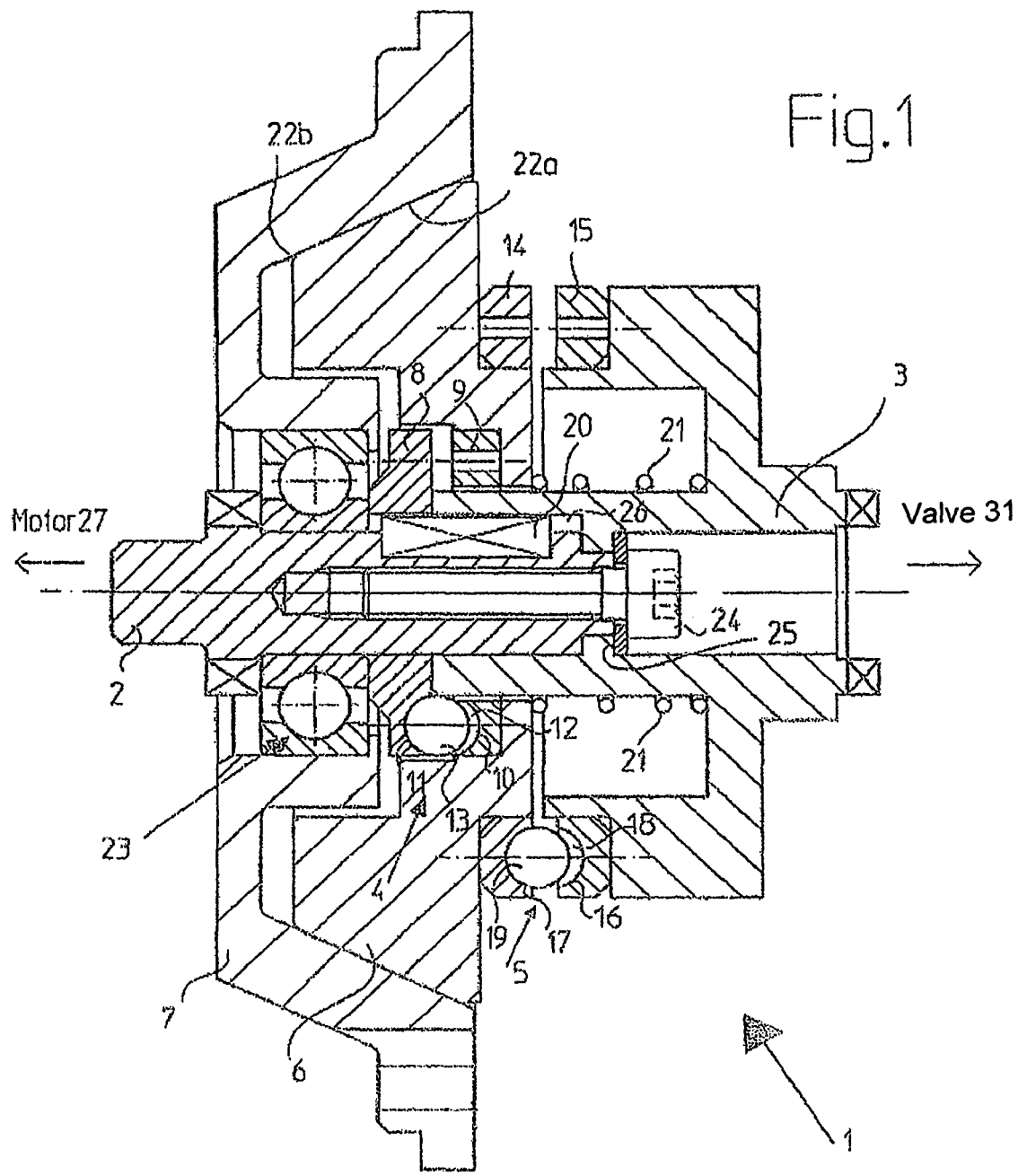
FIG. 1 a longitudinal section through a preferred embodiment of the motor brake of the invention.

The motor brake 1 of the invention is, as shown in FIG. 1, a self-actuatingly switching and self-reinforcing, mechanical, motor brake 1, which is distinguished by the following functions: Torque introduced via the input drive shaft 2 is transmitted in both directions of rotation. In contrast, torque introduced via the output drive shaft 3 reinforces the braking action of the motor brake 1 in both directions of rotation, when a torque is not transmitted simultaneously via the input drive shaft 2 onto the output drive shaft 3. If torques are simultaneously introduced via the input drive shaft 2 and the output drive shaft 3, then the torque introduced via the input drive shaft 2 has precedence over a torque of equal or opposite sense introduced via the output drive shaft 3, when the magnitude of the torque on the input drive shaft 2 is greater than the torque on the output drive shaft 3.

FIG. 1 shows a longitudinal section through a preferred embodiment of the brake 1 of the invention. As already explained, the brake works preferably as a motor brake in connection with an actuator drive. Brake 1 is arranged, for example, in an intermediate flange between the motor 27 and the transmission 28.

The input drive shaft 2 is journalled via a bearing 23 in brake flange 7. In the illustrated case, bearing 23 is a grooved, ball bearing. Of course, also other bearings are best suited for this application, for example a bearing with inclined indexing surfaces on both sides, with or without balls placed therebetween. Reference is made, in this connection, to the already mentioned Through-Ratcheting Sikumat.

The brake cone 6 is connected by shape-interference via a key 20 with the input drive shaft 2. The output drive shaft 3 is seated on the input drive shaft 2. Output drive shaft 3 held against axial displacement relative to the input drive shaft 2 by a screw 24 and a washer 25. Output drive shaft 3 is secured against undefined rotation relative to the input drive shaft 2 by a key 20 in a manner so as to provide tangential play, i.e. the groove 26 is somewhat wider than the key 20. The maximum angular displacement is so selected that a sufficient switching path is available for releasing the brake 1.

Via the pressure spring 21, the motor brake 1 is preloaded, such that a defined braking torque is set on the output drive side. The spring force of the pressure spring 21 is preferably so sized that it compensates the weight of the brake cone 6. Especially, it is provided that the motor brake 1 can be released even during idling. In this way, it achieved that the motor brake 1 safely brakes in the face of a load torque from the output drive side under all operating conditions.

Essential components of the motor brake 1 are the input drive side, axial extraction mechanism 4 interacting with the input drive shaft 2 and the output drive side, axial insertion mechanism 5 interacting with the output drive shaft 3. Both axially acting mechanisms 4, 5 move the brake cone 6 in the axial direction relative to the brake flange 7. If a torque is introduced via the input drive shaft 2, the brake cone 6 is moved axially out of the brake flange 7 against the spring force of the pressure spring 21, and the torque is transmitted onto the output drive shaft 3. A torque introduced via the output drive shaft 3 presses the brake cone 6 additionally against the brake flange 7. Due to the increased friction in the region of the braking surfaces between the brake cone 6 and the brake flange 7, a rotation of the input drive shaft 2, and thus a transmission of the torque from the output drive side, is reinforcingly prevented. An additional torque applied by the output drive side, axial insertion mechanism 5 increases, by a number of times, the intrinsic braking action (as a result of the preloading by the pressure spring 21) between brake cone 6 and braking flange 7 in the case of absent torque on the input drive side. Consequently, the motor brake, or torque blocker, of the invention works in a self-reinforcing manner.

Figure 2:
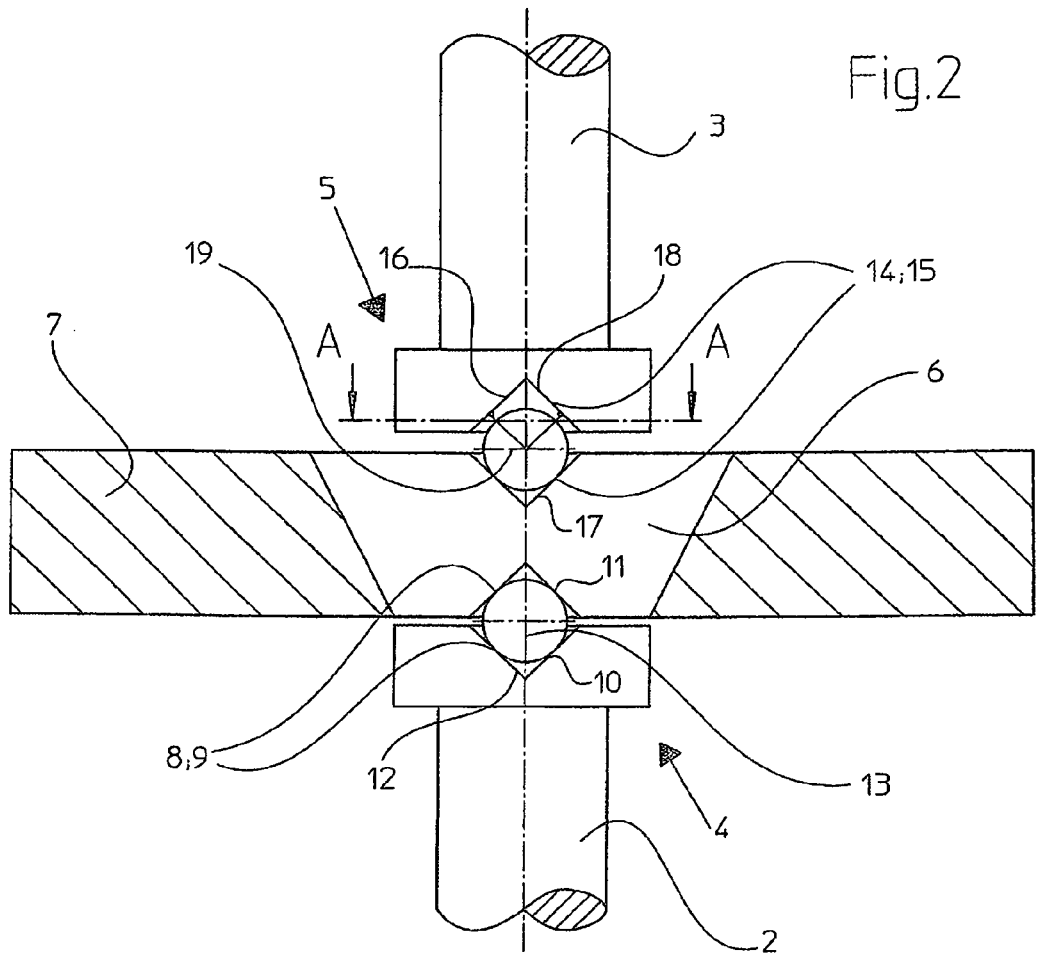
FIG. 2 a longitudinal section in different planes through a simplified representation of the motor brake of the invention.

The simplified, sectional drawing of FIG. 2 displays fundamental individual components and manner of operation of the axial shifting mechanisms 4, 5 of the motor brake 1 of the invention. Essential components of the motor brake 1 of the invention include the brake flange 7, which is securely connected to a housing (not shown), and the brake cone 6 interacting via frictional contact with the brake flange 7 in the zone of the braking surfaces 22a, 22b. Arranged on the input drive shaft 2 is the input drive side, axial extraction mechanism 4. The axial insertion, or locking, mechanism 5 is arranged on the output drive shaft 3.

The following presentation considers the manner of operation of the motor brake 1 of the invention in detail for various different cases:

If the motor 27 is not operating, motor brake 1 is nevertheless always activated by the insertion mechanism 5 and the pressure spring 21. The motor brake has the action of a holding brake.

If a torque is introduced via the output drive shaft 3 and if such is greater than the torque introduced via the input drive shaft 2, then the motor brake 1 acts again as a holding brake with reinforced braking action—such as has already been explained above.

If motor 27 is turning and if the torque of the motor 27 is magnitude-wise greater than the torque introduced via the output drive shaft 3—this corresponding to the case: 'no advancing load'—, then the extraction mechanism 4 acts against the spring force of the pressure spring 21 and this torque suffices to release the motor brake 1 of the invention and to turn the output drive shaft 3. The torque necessary to extract the extraction mechanism 4 against the spring force of the pressure spring 21 corresponds to an internally lost torque; the motor 27 must only be designed stronger than this relatively small, lost torque.

If motor 27 is rotating and if the torque of the motor 27 is magnitude-wise smaller than the torque introduced via the output drive shaft 3—this corresponding to the case: 'advancing load'—, then the extraction mechanism 4 releases itself from the driving ball-ring 8 with the at least one ball 13. After a short time, the counterflank 16; 17 of the recess 18 presses again on the ball 19. At this point in time, the motor brake 1 is again active. As a result of the sequential releasing and engaging of the motor brake 1, it is self-actuatingly controlled.

The extraction mechanism 4 on the input drive side includes the following components: The two ball rings 8, 9, which have on their opposing surfaces milled-in recesses 12 having inclined switching surfaces 10, 11. In the illustrated case, these recesses 12 are, for example, embodied as ball-run grooves, in which balls 13 are guided. At least one ball-run groove 12 is provided on a circular ring. Shown in FIG. 2 is a preferred embodiment with three ball-run grooves 12. This provides a high accuracy of response and a play-free torque transmission. As already mentioned, instead of the ball-run rings, also rings with helical surfaces, double rollers or single rollers can be utilized.

Located on the output drive side are likewise two ball rings 14, 15, having, on their opposed surfaces, milled-in recesses 18 with inclined surfaces 16, 17. Also here, the recesses 18 are embodied as ball-run grooves, in which the balls 19 are guided.

Operation of the axial shifting mechanisms is shown simplified in FIG. 2: Essential components of the motor brake 1 are the brake cone 7 interacting with the brake flange 6, as well as the input drive side, extraction mechanism 4 and the output drive side, insertion mechanism 5. The release mechanism of the input drive side, extraction mechanism 4 and the locking mechanism of the output drive side, insertion mechanism 5 have on each two, oppositely-lying surfaces, recesses 12; 18, wherein, in each case, a ball 13; 19 is guided between a pair of recesses 12; 18. If a torque is introduced via the input drive shaft 2, the two shafts 2, 3, and, thus, the two ball rings 8, 9 are rotated relative to one another over the balls 13. Since the balls 13 roll on the inclined flanks 10, 11 of the recesses 12, a bounded, axial extraction of the brake cone 6 from the brake flange 7 is achieved: The input drive shaft 2 and the output drive shaft 3 rotate freely.

Figure 2A:
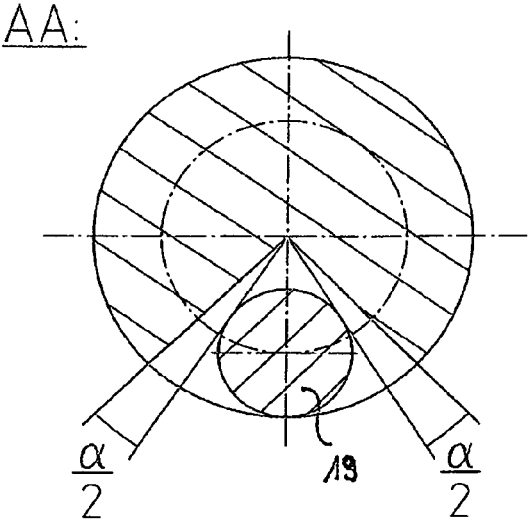
FIG. 2a a cross section taken according to the cutting plane A-A of FIG. 2.

If a torque is introduced via the output drive shaft 3, then the balls 19 roll likewise on the inclined flanks 16, 17 of the recesses 18 and press the brake cone 6 into the brake flange 7. Since the motor brake 1 then locks, a torque introduced via the output drive shaft 3 is not transmitted to the input drive shaft 2 and thus also not to the motor 27. In the case of a torque introduction via the output drive shaft 3, the axial extraction mechanism 4 and the axial insertion mechanism 5 are displaced relative to one another maximally by an angle alpha. This is illustrated in FIG. 2a, which shows a cross section taken according to the cutting plane A-A of FIG. 2.

According to the invention, it must be assured that the axial shiftings do not mutually block one another, when torques are introduced simultaneously via the input drive shaft 2 and the output drive shaft 3. This is achieved by the fact that the switching elements 12, 13; 18, 19 of the input drive side, extraction mechanism 4 and the output drive side, insertion mechanism 5 are arranged on different radii; the switching elements 12, 13 of the input drive side, extraction mechanism 4 are arranged on a smaller radius then the switching elements 18, 19 of the output drive side, insertion mechanism 5. In the case of a rotational movement of equal- or opposite-sense by the operating element, e.g. valve, 31 on the output drive shaft 3 coupled with simultaneous rotational movement on the input drive shaft 2, priority therefore always lies with the input drive side, i.e. when a rotational movement is applied to the input drive shaft 2, the brake cone 6 is pressed out of the brake flange 7 via the inclined planes 10, 11 of the recesses 12 and the balls 13, and the rotational movement is transmitted to the output drive shaft 3. If no rotation is applied to the input drive shaft 2, then as a result of the rotational movement at the output drive shaft 3, the axial output drive side, insertion mechanism 5 of the output drive shaft 3 will act via the balls 19 on the inclined planes 16, 17 of the recesses 18 and, lastly, on the brake cone 6. By introduction of a torque from the output drive shaft, thus a locking action is achieved.

Figure 3:
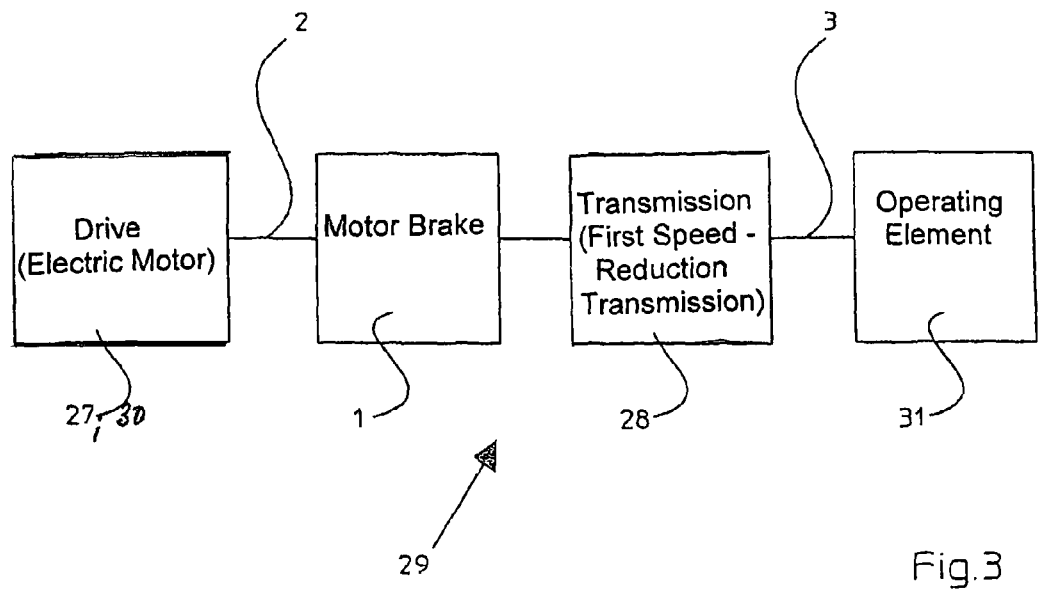
FIG. 3 a first arrangement of the motor brake of the invention in an actuator drive.
Figure 4:
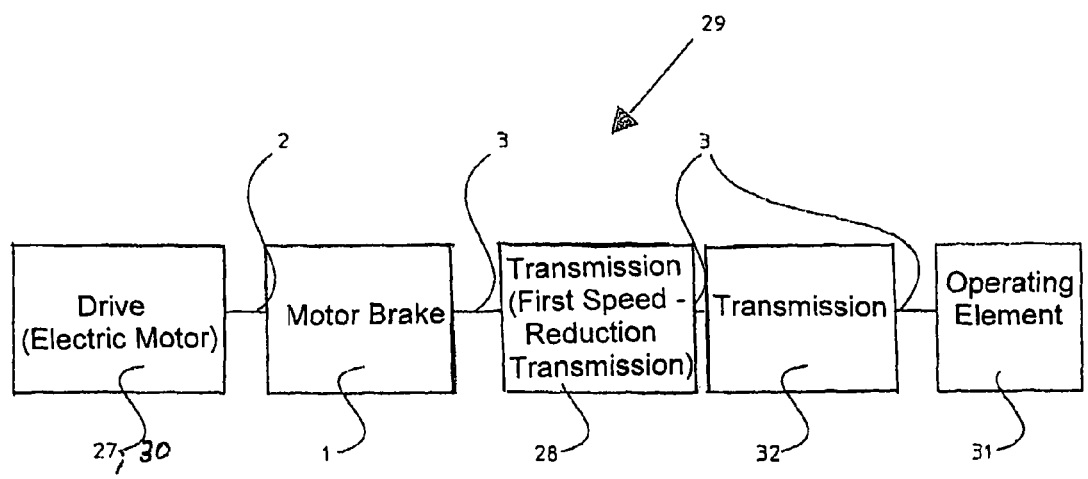
FIG. 4 the second arrangement of the motor brake in an actuator drive.

FIGS. 3 and 4 show, schematically, different forms of embodiment illustrating how the motor brake 1 of the invention can be utilized in an actuator drive 29. In the case of the form of embodiment shown in FIG. 3, the input drive unit, here a motor 27, operates the operating element 31 directly via the input drive shaft 2 and the output drive shaft 3. Operating element 31 is, preferably, an adjusting element, e.g. a valve or a gate (in each case with a spindle and a threaded member on the spindle), a throttle or a damper. Depending on the adjusting element 31, the actuation, or the displacement process, introduced via the drive unit 27 is a rotational movement or a swinging movement.

Drive unit 27 is preferably a direct drive. However, it is also possible to provide after the electric motor 27 a first speed-reduction transmission 32. Of course, alternatively or additively to the electrical drive unit 27, also a separately actuatable, adjusting wheel 30, e.g. a hand-wheel for manual actuating of the operating element 31, can be used. The torque blocker of the invention, or the motor brake 1 of the invention, is associated with the input drive shaft 2.

FIG. 4 is a schematic illustration of a second embodiment of how the torque blocker, or motor brake 1, of the invention can be advantageously applied in the case of an actuator drive 29. The form of embodiment shown in FIG. 4 differs from that shown in FIG. 3 by a second speed-reduction transmission, which is arranged on the output drive shaft 3 between the first speed-reduction transmission 28 and the operating element 31. Speed-reduction transmission 32 is, preferably, a worm-gear transmission. Worm-gear transmissions are usually so designed that they possess an intrinsic self-blocking, which effectively prevents an unintended rotation of the output drive shaft 3. Such an actuator drive 29 is especially advantageous, since, due to the torque blocker 1 between the drive part 27 and the first speed-reduction transmission 28, the intrinsic self-blocking of the first speed-reduction transmission 28 and a present, second speed-reduction transmission 32 does not have to be relied on. In this way, the total efficiency of the actuator drive 29 can be significantly improved.

The invention claimed is:

1. A mechanical brake, comprising:
an input drive shaft;
an output drive shaft;
an axial, shifting mechanism arranged on said input drive shaft; and
an axial, shifting mechanism arranged on said output drive shaft, wherein:
the two axial shifting mechanisms are so embodied, that their shifting directions are opposite and that, in the case of introduction of a torque via said input drive shaft and/or said output drive shaft, said axial shifting mechanism associated with said input drive shaft has precedence over said axial shifting mechanism associated with said output drive shaft, wherein:
said axial shifting mechanism arranged on said input drive shaft is arranged on a smaller radius relative to the longitudinal axis of said input/output drive shafts than said axial, shifting mechanism arranged on said output drive shaft.

2. The mechanical brake as claimed in claim 1, wherein:
said axial shifting mechanism associated with said input drive shaft is an axial extraction mechanism; and
said axial shifting mechanism associated with said output drive shaft is an axial insertion mechanism.

3. The mechanical brake as claimed in claim 2, wherein:
said axial extraction mechanism and said axial insertion mechanism are so embodied that they work as follows:
for the case in which the magnitude of the torque introduced via said input drive shaft is larger than the magnitude of the torque introduced via said output drive shaft, said axial extraction mechanism is unlocked and said axial insertion mechanism is blocked, so that torque is transmitted from said input drive shaft to said output drive shaft.

4. The mechanical brake as claimed in claim 2, wherein:
said axial extraction mechanism and said axial insertion mechanism are so embodied that they work as follows: for the case in which the magnitude of torque introduced via said input drive shaft is smaller than the magnitude of torque introduced via said output drive shaft, said extraction mechanism and, thus, said input drive shaft are locked.

5. The mechanical brake as claimed in claim 2, further comprising:
a spring element, wherein:
said axial extraction mechanism and said axial insertion mechanism are so embodied that they work as follows: for the case in which no torque is introduced via said input drive shaft and no torque is introduced via said output drive shaft, said axial extraction mechanism is locked via action of a predetermined spring force of said spring element.

6. The mechanical brake as claimed in claim 2, wherein:
in the case that no torque lies on said input drive shaft and torque lies on said output drive shaft, the blocking action of said axial extraction mechanism is reinforced by the torque introduced via said output drive shaft.

7. The mechanical brake as claimed in claim 2, wherein:
said axial extraction- and/or insertion-mechanism are/is composed of two switching rings having inclined switching surfaces, which, in the case of a torque introduction via said output drive shaft, are displaceable relative to one another by an angle (alpha).

8. The mechanical brake as claimed in claim 7, wherein:
said axial extraction- and/or insertion-mechanism have/has recesses, said recesses on said switching rings of said input drive side, extraction mechanism and said recesses on said switching rings of said output drive side, insertion mechanism have a different slope and/or a different dimensioning.

9. The mechanical brake as claimed in claim 7, wherein:
in each case, between two switching surfaces of said switching rings, a switching element is arranged.

10. The mechanical brake as claimed in claim 9, wherein:
said switching elements are balls, rollers or needles.

11. The mechanical brake as claimed in claim 10, wherein:
said balls between said two switching rings of said extraction mechanism have a diameter which is different from the diameter of said balls arranged between said switching rings of said insertion mechanism.

12. The mechanical brake as claimed in claim 1, further comprising:
a first, rotationally symmetric, brake element; and
a second, rotationally symmetric, brake element, which is connected with said output drive shaft, wherein:
said two brake elements so interact due to their complementary shapes, that, in the case of locking of said extraction mechanism, blocking- or braking-action of said first brake element and said second brake element is effected.

13. The mechanical brake as claimed in claim 12, wherein:
said first rotationally symmetric brake element is not rigid.

14. The use of a mechanical brake described in claim 1, for application as a torque blocker in an actuator drive.

* * * * *